United States Patent [19]

Mills

[11] 4,233,195
[45] Nov. 11, 1980

[54] METALLIC PRINTING INKS AND METALLIZED PAPERS PRINTED THEREWITH

[75] Inventor: W. Ralph Mills, Richmond, Va.

[73] Assignee: Reynolds Metals Company, Richmond, Va.

[21] Appl. No.: 15,409

[22] Filed: Feb. 26, 1979

[51] Int. Cl.³ .................... C09C 1/62; C09C 3/10; C09D 11/10
[52] U.S. Cl. .................... 260/23 S; 106/20; 106/27; 106/30; 106/290; 260/32.8 A; 260/33.6 A; 260/33.6 UA; 260/DIG. 38; 427/180; 427/199; 428/464
[58] Field of Search ........... 106/290, 20, 27, 30; 260/23 S, DIG. 38, 33.6 A, 33.6 UA, 32.8 A; 427/180, 199; 428/464

[56] References Cited

U.S. PATENT DOCUMENTS

| | | | |
|---|---|---|---|
| 2,144,953 | 1/1939 | Ziehl | 106/290 |
| 3,041,303 | 6/1962 | Nelson | 106/290 |
| 3,074,801 | 1/1963 | Gessler et al. | 106/290 |
| 3,463,659 | 8/1969 | Dragoon et al. | 428/454 |
| 3,575,900 | 4/1971 | Ponyik | 260/21 |
| 3,692,731 | 9/1972 | McAdow | 106/290 |
| 3,918,984 | 11/1975 | High et al. | 106/290 |
| 4,003,872 | 1/1977 | Rolles et al. | 106/290 |
| 4,025,665 | 5/1977 | Hannon | 106/290 |
| 4,116,710 | 9/1978 | Heikel | 106/290 |

OTHER PUBLICATIONS

Canadian Paint and Varnish Magazine, May 1949, pp. 28, 30, 32, 57, 58, 59, 60 and 62.
Junius D. Edwards et al., *Aluminum Paint and Powder*, 3rd edition, Reinhold Publishing Corp., N. Y. (1955) pp. 49-63, 104-106, and 183-185.

*Primary Examiner*—Ronald W. Griffin
*Attorney, Agent, or Firm*—Glenn, Lyne, Girard & McDonald

[57] ABSTRACT

A thermoplastic resin, a leafing grade aluminum paste, and a solvent are mixed to form a metallic printing ink which is useful for metallizing a wide range of paper stocks by selected conventional printing processes, such as rotogravure printing. The metallic ink can be applied at four pounds per ream (6.5 g/m²) of dry coating to form a satisfactory moisture barrier, but the ink is similar to paint in that a glossy aluminum finish is produced by leafing of the aluminum particles when the coated paper is heated, as by passing the paper over a heated roll.

17 Claims, No Drawings

METALLIC PRINTING INKS AND METALLIZED PAPERS PRINTED THEREWITH

BACKGROUND OF THE INVENTION

1. Field of the Invention

This invention relates to barrier coatings on paper and especially relates to printing inks that provide a metallic appearance. It further relates to thermal insulation and additionally relates to protective or decorative wrappings and packagings made from paper and plastics to which such inks have been applied.

2. Review of the Prior Art

Metallized papers are useful for many purposes. They provide a less bulky and less expensive paper than foil-laminated paper for many wrapping, covering, and decorative uses where the superb barrier properties of foil-laminated paper are not needed. Holiday and gift wrapping papers, pouch papers, and reflective papers for insulation which do not require the gas-tight barrier properties of foil-laminated papers are examples of such uses.

At the present time, metallized papers and metallized plastics are principally prepared by vacuum deposition of metal onto a moving sheet to form a film varying in thickness from 0.01 mil, or even less, to as much as 3 mils. The metal film conforms exactly to the surface of the paper or plastic base and often must be covered with a protective coating. The metal particles do not bond to each other so that the protective coating must provide whatever barrier properties are needed. Such coatings are applied by processes which are relatively expensive and not readily available to the converter.

Finely divided aluminum particles have long been available as a paste, in order to avoid explosion hazards. Preparation of such pastes is taught, for example, in U.S. Pat. No. 2,144,953 which is directed to pigment pastes consisting essentially of metal flakes, such as 65% aluminum, and a vehicle or thinner comprising stearic acid in solution in an amount equal to about 1% based on metal.

Heat-setting printing inks which are pigmented with metallic powders, so that the inks exhibit unusually effective leafing of the metallic powder on drying and good binding of the metallic powder to the paper, are disclosed in U.S. Pat. No. 3,074,801. As described in Example III, the ink may contain aluminum powder and various thermoplastic resins, such as hydrocarbon resins, which are dissolved in petroleum hydrocarbon with boiling ranges between 450° and 650° F. Such inks are not useful for application in conventional printing operations due to the high boiling points of the solvent component which does not permit drying to a non-tacky state under printing press conditions.

U.S. Pat. No. 3,575,900 is directed to electrostatically sprayable coating solutions containing intimately blended aluminum pigment concentrates which may comprise non-leafing or leafing aluminum pigments dispersed in mineral spirits in combination with a copolymer of vinyl chloride, vinyl acetate, and maleic acid. Again, the drying properties of such solutions do not make them practically applicable to printing operations.

As another approach to forming metallized paper, U.S. Pat. No. 3,463,659 discloses a method for applying a base coat to a sheet by supercalendering, applying a lacquer topcoat, vacuum depositing a metal film (about three millionths of an inch thick) as a metal gas or vapor, and optionally applying a print prime coat thereon. For aluminum, the pressure must be about 0.5 micron in the evaporation area. The dried base coat formulations contain about 52–88% by weight of inorganic coating pigment, about 2–20% by weight of a thermoplastic pigment, about 5–25% by weight of a synthetic emulsion polymer adhesive, and from about 5–25% by weight of a water or alkali-soluble natural polymer adhesive.

There is accordingly a need for a simpler and less expensive process for manufacturing metallized paper and plastics, one in which the base can be directly combined with the metallized coating without requiring base and top coatings, and which is useful with a wide range of papers as the base.

SUMMARY OF THE INVENTION

In accordance with the principles of this invention, a process is herein provided for applying a single metallized coating at printing press speeds, e.g. 300 feet per minute, and especially with roto-gravure printing press equipment, to paper-based stocks having a wide range of surface smoothness, including machine-finished kraft paper, without supercalendering or applying undercoating.

Further, a printing ink has surprisingly been discovered which is similar to metallic paint in that the metallic finish is produced by a "leafing" action of finely divided metal particles contained in a vehicle, this leafing action being produced when the particles move to the surface of the vehicle and come together in overlapping relationship so as to produce a metallic layer.

This printing ink is to be distinguished from paints, however, in that it is fast drying and can be applied with conventional printing equipment, such as with rotogravure rolls in a rotary press. On drying, the ink is further distinguished from paint because the ink does not leaf during drying as paint does. Instead, it must be heated after it has dried, such as by passing it briefly over a hot roll having a surface temperature of between about 200° and about 400° F.

A preferred embodiment of this printing ink comprises:

A. 42 weight percent resin binder;
B. 16 weight percent leafing grade aluminum paste which contains stearic acid; and
C. 42 weight percent solvent.

DETAILED DESCRIPTION

The polymeric binder component of the ink compositions described herein are generally characterized as having the following characteristics:

(1) It, in combination with the solvents described herein, is compatible with the metallic pastes and provides a suitable dispersion medium for the pastes;

(2) It is a thermoplastic polymer for which suitable paste-compatible solvents, as described herein, are available;

(3) After printing or deposition from solution it dries to a non-tacky state when exposed to temperatures in the range of between about 150° to 200° F. for a period of about 1 to 3 seconds; and (4) It has a softening point such that a thin, printed layer of the polymer when passed over a roller for about 0.5 seconds of contact at a temperature of between about 200° to 400° F., softens sufficiently as to permit leafing pastes, as described herein, to leaf and provide a uniform metallic appearing layer.

Polymers derived from ethylenic monomers such as, for example, polystyrene, substituted polystyrene, copolymers of styrene and other ethylenic polymers, vinyl polymers such as polyvinylidene chloride, polyvinyl alcohol, polyvinyl acetate, vinyl toluene, styrene-acrylonitrile copolymers, styrene-butadiene polymers, may be suitable for use in the inks of the present invention. Polymers of styrene and copolymers of styrene have been found particularly well suited to this application and are therefore specifically preferred.

A preferred resin binder is a hard, color-stable, substituted styrene copolymer resin having a Vicat softening point of about 200° F. Thermoplastic polystyrene resins were also found to be satisfactory.

The solvent component of the printing inks described herein should have the following characteristics:

(1) It should be a solvent for the polymeric ink binder;

(2) It should have a boiling point such that substantially all of the solvent can be driven from a "print" under the time and temperature conditions normally encountered in a press operation, i.e. exposure to a temperature of between about 150° and 200° F. for a period of from about 1 to about 3 seconds. Under the aforementioned conditions, sufficient solvent must be driven off as to permit the polymeric binder to yield a substantially "non-tacky" surface. Hydrocarbons solvents including certain aliphatic and aromatic hydrocarbons, esters, lower aliphatic ketones and alcohols having boiling points in the temperature range of between about 80° and 125° C. have been found particularly useful in this regard; and (3) It should be compatible with the metallic leafing paste, i.e. it should form an acceptable ink in the conventional sense of providing in connection with the dissolved binder a suitable dispersion matrix for the paste.

Specifically preferred solvents include aliphatic ketones, especially methyl-ethyl ketone, methylisobutyl ketone and mixtures thereof, and toluene.

Suitable aluminum pastes have a trace to 0.1% retention on a Number 325 (44-micron) screen, non-volatile matter which at 220°–230° F. constitutes 65% or more by weight of the paste (e.g. 65 to 75% by weight of the paste and an approximate bulking value in gallons per pound of 0.075–0.085. Leafing pastes, containing up to about 4% of stearic acid, are needed to impart a glossy appearance with heat treatment as described herein. Non-leafing pastes simply do not leaf, i.e., they do not impart a changed appearance to the printed surface. A suitable leafing guide paste comprises, for example: (a) 62–72.5 weight percent of finely divided aluminum flakes; (b) 1.0–3.0 weight percent of stearic acid; and (c) 24.5–37 weight percent of exempt mineral spirits. (Exempt mineral spirits typically contain about 56% paraffin, 39% monocycloparaffin, 4% alkyl benzenes, and very small amounts of naphthalenes and olefins; where the apparent molecular weight is 140, the apparent carbon number of the paraffin component is 9.99, and the apparent carbon number of the aromatics component is 9.14.). In general, the type of binder and the presence of stearic acid appear to be critical if good leafing characteristics are to be obtained for the inks described herein.

A printing ink of this invention may be satisfactorily applied to a wide range of papers and plastic films. Other than for decorative purposes, there is no advantage to be obtained by using an underlayment or coating to enhance smoothness of a paper because very little additional reflectance is gained thereby. In combination with some resins, additional reflectance is obtained by "blooming" or "leafing" the metal particles, but with other resins there is no advantage.

The invention may be more thoroughly understood by consideration of the following examples in which a resin solution was prepared by dissolving a resin in a solvent, usually at about 50% solids, and then blending the solution with an aluminum paste, at a weight ratio of solution:paste of about 4:1 to about 5:1, to form the printing ink. A printing test was in most cases run by applying the printing ink with a Number 6 or Number 8 drawbar on a 24-inch by 36-inch sheet, furnishing 2 to about 5 pounds of oven-dry coating per ream of 432,000 square inches, equalling about 80–190 milligrams per square yard or 2.5–8 grams/m$^2$.

EXAMPLE 1

A mixture was prepared of equal parts of a pentaerythritol ester of hydrogenated rosin sold under the trademark Pentalyn by the Hercules Powder Co. and of a condensation of an arylsulfonamide with formaldehyde which is sold by the Monsanto Chemical Co. under the trademark Santolite MHP. This mixture was dissolved in toluene at 50% solids content, and one of two printing pastes was then blended therein to make a printing ink, and each printing ink was individually tested. These printing pastes were both leafing aluminum pastes sold by the Reynolds Metals Company as Exempt 5-202 which is an extra-fine lining grade of leafing pigment and is designed for inks and other coatings having a lubricant; and Exempt 5-271 which is an extra-fine lining high-solids aluminum paste possessing greater specular reflectivity (gloss) and metallic appearance. The exempt 5-202 paste contains about 66 wt.% finely divided aluminum flakes, about 3 wt.% stearic acid, less than 0.7 wt.% impurities (other than fatty and oil matter), less than 0.1 wt.% coarse particles (greater than 44 micron particle size), balance exempt mineral spirits. The Exempt 5-271 paste is similar to the Exempt 5-202 paste except that it contains about 72.5% finely divided aluminum flakes. The weight ratio of solution to paste in both cases was 5:1. All were compatible, all performed well after drawdown and heat treating, but it was apparent that too much paste was used in these formulations, as demonstrated by the well-known tape test.

EXAMPLE 2

A number of drawdowns were made with printing inks containing the Exempt 5-202 printing paste, toluene, and one or more of the following resins: a thermoplastic polyamide resin; a hard, tack-free modified pentaerythritol resin ester sold by Hercules Powder Co. under the trademark Cellolyn 102; a coconut oil-based alkyd resin sold by Archer Daniels Midland Co. under the trademark AROPLAZ 2575-X-60; a modified maleic resin sold by Union Camp Corporation under the trademark UNI-REZ 7024; a glycerol ester of hydrogenated resin sold by Hercules Powder Co. under the trademark Staybelite Ester 10; and an ethylene glycol ester of polymerized resin sold by Hercules Powder Co. under the trademark Poly-pale Ester 1. Some of these inks showed incompatibility, others gave fair to very good drawdowns but remained tacky, and still others dried properly but failed to leaf well when heated to 300° F.

EXAMPLE 3

Santolite MHP was dissolved in toluol at 50% solids content, and two printing inks were prepared therefrom with the same two printing pastes that were used in Example 1 at weight ratios of 15:1. Good leafing and higher gloss was obtained, but all four drawdowns were very tacky.

EXAMPLE 4

Pentalyn H, which is a hard, amber-colored resin designed primarily as a tackifying resin for use in adhesives, combining excellent tackifying properties with high bonding strength and superior aging properties, was dissolved in toluene to form a solution having 50% solids, and the same four resins as in Examples 2 and 3 were used to form four printing inks at a weight ratio of four parts resin solution to one part of printing paste. The ink containing the Exempt 5-271 printing paste was poor with respect to leafing performance. And the ink containing the Exempt 5-202 printing paste was the better of the two inks but nevertheless merited only a fair grading.

EXAMPLE 5

A solution was prepared as a 50% mixture in toluene of a pentaerythritol ester of hydrogenated resin, sold as Pentalyn A by the Hercules Powder Co. This solution was blended with the Exempt 5-202 printing paste at a weight ratio of 4:1 to form a printing ink. The drawdown results were fair but better than with Pentalyn H because the ink was less tacky.

EXAMPLE 6

A printing ink was prepared by dissolving a resin-derived alkyd-type resin, which is sold as Neolyn 40 by the Hercules Powder Co., to form a 50% solution in toluene and blending it with the Exempt 5-202 printing paste at a weight ratio of 4:1. The printing ink was compatible, but drawdown showed that it did not dry to a hard finish.

EXAMPLE 7

Four printing inks were prepared by dissolving nitrocellulose, chlorinated rubber (sold under the trademark Parlon by the Hercules Powder Co.), vinyl chloride, and ethylcellulose in toluene to form 50% solutions by weight. Each was blended with the Exempt 5-202 printing paste at a weight ratio of 4:1. Drawdown showed that none was a good binder for the aluminum particles.

EXAMPLE 8

A printing ink was prepared by dissolving a modified maleic resin sold under the trademark UNI-REZ 7024 by the Union Camp Corporation to form a 50% solution in toluene and then blending it with the Exempt 5-202 printing paste at a 4:1 ratio. The results after drawdown were very poor.

EXAMPLE 9

A printing ink was prepared by forming a 50% solution in toluene of a hard, color-stable, substituted vinyl toluene-styrene copolymer resin sold by the Pennsylvania Industrial Chemicals Co. under the trademark Piccotex LC and blending the solution with the Exempt 5-202 printing paste 5-202 at a 4:1 ratio. After drawdown heat treating, the surface had a good metallic appearance but was tacky.

EXAMPLE 10

Another printing ink was made with Pentalyn H by preparing a 50% solution in toluene and blending it with a 1:1 mixture of Exempt 5-202 printing paste and a non-leafing printing paste. The drawdown tests and heat treating showed that this mixture was of no value.

EXAMPLE 11

Another printing ink was made with the vinyl toluene-styrene copolymer resin sold under the trademark Piccotex LC as a 50% solution in toluene which was then blended with a mixture of the Exempt 5-202 printing paste and the same non-leafing printing paste. Drawdown and heat treating also showed that there was no value to this ink.

EXAMPLE 12

A printing ink was made with a hard, color-stable, substituted styrene copolymer resin available in a rink and ball softening point of 100 which is sold by the Pennsylvania Industrial Chemical Co. as Piccotex 100. It was prepared as a 50% solution in toluene and blended with the Exempt 5-202 printing paste at a 4:1 ratio. Drawdown and heat treating showed excellent qualities and a mirror-like finish.

EXAMPLE 13

A similar printing ink was prepared by forming a 50% solution in toluene with Piccotex 100 styrene-copolymer resin and blending the solution at a 4:1 weight ratio with the Exempt 5-271 printing paste. The results after drawdown and heat treating were also excellent and even better than with the Exempt 5-202 paste.

EXAMPLE 14

A printing ink was made with the styrene-copolymer resin sold as Piccotex 100 and with methyl ethyl ketone as a 50% solution. When blended with the Exempt 5-271 printing paste at a 4:1 ratio, the drawdown tests and heat treating showed excellent results, better drying, and better leafing than those prepared with toluene.

EXAMPLE 15

A printing ink was made with the vinyl tolulenestyrene copolymer resin which is sold under the trademark Piccotex LC resin. It was prepared as a 50% solution in methyl ethyl ketone which was blended with the Exempt 5-271 printing paste at a 4:1 ratio and used on three types of papers in a pilot plant run. Printing was done with "Nupad" cylinders having either 150 or 160 mechanical etchings per linear inch. The hot roll was set at 300° F. and followed by chill rolls. The results after the drawdown tests were excellent on a 40-pound clay coated paper, supercalendered on both sides. Leafing was excellent, resulting in a brilliant finish. On a 35-pound high-density sheet, known as an opague pouch, pie wrap, or imitation glassine, at 20 to 40 pounds per ream the results were likewise excellent, demonstrating a high degree of uniformity. On a similar pouch paper with an undercoat beneath the test printing, the results were excellent but no better than with the same paper without the undercoat.

EXAMPLE 16

The printing ink of Example 15 was applied to the machine glazed side of a 30-pound kraft paper with excellent results. The coating had an infrared (550 millimicrons wavelength) reflectance of 72% after heat treating as compared to an infra-red reflectance of 79% for shiny foil on the machine finish side of natural kraft paper.

EXAMPLE 17

As the beginning of a brief series of tests in which a K-1 Beckman Spectrophotometer having a 24500 reflectance attachment was used to measure the mirroring quality of the inked coatings before and after heat treating, a solution was made of 50 parts by weight of a white, odorless, non-flammable, granular powdered chlorinated rubber, sold under the trademark Parlon -20 by the Hercules Powder Co., 50 parts by weight of toluene, and 50 parts by weight of methyl ethyl ketone. This solution was mixed with the Exempt 5-202 printing paste at a weight ratio of 4:1. Using a Number 8 drawbar, it was coated on a 40-pound coated and supercalendered bleached paper (Paper A), a 35-pound kraft paper (Paper B), and a 35-pound kraft paper (Paper C) and tested for infrared reflectance before and after heat treating at 300° F. The results are shown in the accompanying table.

EXAMPLE 18

A thermoplastic polystyrene resin, sold under the trademark Piccolastic D-150 by the Pennsylvania Industrial Chemicals Co., was made into a solution at 50 parts of resin in 35 parts of methyl ethyl ketone and 35 parts of methyl isobutyl ketone. This solution was blended with the Exempt 5-202 printing paste at a weight ratio of 4:1 to form a printing ink which was applied with a Number 8 drawbar on the same three grades of paper, viz., a 40-pound coated and supercalendered bleached paper, a 30-pound kraft paper, and a 35-pound kraft paper. The coatings were then measured for infrared reflectance at 550 millimicrons before and after heat treating. The results are shown in the same table.

EXAMPLE 19

Another grade of thermoplastic polystyrene resin, sold under the trademark Piccolastic E-125, was made into a solution at 50 parts of the resin to 35 parts methyl ethyl ketone and 35 parts methyl isobutyl ketone. This solution was then blended with the Exempt 5-202 printing paste at a weight ratio of 4:1 to form a printing ink which was applied with the Number 8 drawbar on the same three grades of coated and kraft papers. After drying, the coatings were tested for infrared reflectance before and after heat treating. The results are likewise shown in the accompanying table.

EXAMPLE 20

A pilot plant run was made with a printing ink prepared by making a solution of 1000 parts Piccotex LC in 1000 parts of methyl ethyl ketone and blending therein 100 parts by weight of Exempt 5-271 printing paste, the weight ratio of solution to paste thus being 5:1. The ink was tested on the 30-pound kraft paper and measured with the spectrophotometer after heat treating only.

EXAMPLE 21

As controls, a foil/natural kraft paper laminate had a reflectance of 82, and a commercially available vacuum-metallized paper had an infrared reflectance of 84%.

As can be seen by the data in the table, the metallized paper of this invention is nearly as light reflective as foil-laminated and commercially metallized papers. It is also evident that heat treating makes no difference for rubber-based printing inks but makes 5–10% difference for inks based upon styrene copolymer resins. The ink-printed natural kraft papers, which are particularly suitable for insulation purposes, have an even higher measured infrared reflectance than the supercalendered pouch paper and coated bleached paper even though their appearance is appreciably less brilliant than the ink-printed coated and pouch papers.

| PAPERS | A | | B | | C | |
|---|---|---|---|---|---|---|
| Post-Printing Treatment | (1) | (2) | (1) | (2) | (1) | (2) |
| Example No. | Reflectance (%) of Infrared Light (550 millimicrons wavelength) | | | | | |
| 17 | 62 | 62 | 64 | — | 64 | 64 |
| 18 | 66 | 60 | 69 | — | 70 | 62 |
| 19 | 61 | 57 | 73 | — | 67 | 61 |
| 20 | — | — | 74 | — | — | — |

(1) As applied
(2) As heat treated

The metallized papers of this invention possess improved barrier properties with respect to water and water vapor because of the uniformity and binding properties of the resin therein. Hence, these papers are quite satisfactory as wrapping papers, whenever it is desirable to protect the wrapped contents from desiccation, from humidity, or from exposure to dirt, rain, or sunlight.

These metallized papers are also useful as heat-reflective barrier papers when the paper base is a natural kraft paper or board of any reasonable weight. Such metallized papers are useful, for example, as backings for fiberglass insulations, fiberboards, flakeboards, hardboards, insulation boards, and the like.

By incorporating borates and other well-known flameproofing agents into the printing ink, resistance to fire can be enhanced so that their flame resistance approaches that of foil-laminated papers.

The printing inks of this invention are applicable to a paper or plastic base with any relief or intaglio printing process, such as any of the gravure processes, including photogravure and rotogravure. These inks are not suitable for offset printing but may be useful with selected planographic printing processes wherein the ink film is not split between transfer cylinders.

Because it will be readily apparent to those skilled in the art that innumerable variations, modifications, applications, and extensions of these embodiments and principles can be made without departing from the principles and scope of the invention, wherein what is herein defined as such scope and is desired to be protected should be measured and the invention should be limited, only by the following claims.

What is claimed is:

1. A metallic printing ink comprising a thermoplastic resin selected from the group consisting of substituted styrene copolymer resins, chlorinated rubber, and styrene resins; a leafing grade aluminum paste; and a solvent selected from the group consisting of toluene, methyl ethyl ketone, methyl isobutyl ketone, and mixtures thereof, said printing ink being applicable to coated papers and to uncoated papers and to plastics by printing processes to provide a brilliant finish after heat treatment at about 300° F.; and said ink being further characterized by being capable of drying to a non-tacky state when exposed to temperatures in the range of between about 150° and 200° F. for a period of from about 1 to about 3 seconds, and by said thermoplastic resin being sufficiently soft as to permit leafing of said leafing grade paste when said ink is applied as a printed coating on a paper base and said paper base is then passed over a roller heated to a temperature of between about 200° and about 400° F. for about 0.5 seconds of contact with said roller.

2. The metallic printing ink of claim 1 wherein one of said printing processes is rotogravure printing.

3. The metallic printing ink of claim 1 wherein said aluminum paste comprises about 62-72.5% by weight of aluminum flakes having a particle size distribution characterized by a retention of about up to 0.1% by weight on a 44-micron screen.

4. The metallic printing ink of claim 3 wherein said paste contains 1.0-3.0% by weight of stearic acid.

5. The metallic printing ink of claim 4 wherein said paste contains 24.5-37% by weight of exempt mineral spirits.

6. The metallic printing ink of claim 1 wherein said printing ink comprises by weight approximately:
  A. 42 weight percent of said resin binder;
  B. 16 weight percent of said leafing grade aluminum paste; and
  C. 42 weight percent of said solvent.

7. The metallic printing ink of claim 6 wherein said aluminum paste comprises by weight:
  A. 62-72.5 weight percent of finely divided aluminum flakes;
  B. 1.0-3.0 weight percent of stearic acid; and
  C. 24.5-37 weight percent of exempt mineral spirits.

8. A metallized paper consisting essentially of a paper base and a printed coating with the ink of claim 1, said printed coating having an infrared reflectance of 550 millimicrons wavelength light of at least 60 percent.

9. The metallized paper of claim 8 wherein said printed coating is applied directly onto said paper base by relief and intaglio printing processes.

10. The metallized paper of claim 9 wherein said paper base is natural kraft.

11. The metallized paper of claim 9 wherein said printed coating is appled at about 2.5 to 8 grams/square meter.

12. The metallized paper of claim 8 wherein said aluminum flakes have a particles size distribution characterized by a retention of up to about 0.1% by weight or a 44 micron screen.

13. The metallized paper of claim 12 wherein said printed coating is a moisture barrier.

14. The metallized paper of claim 13 wherein said printed coating is usable without a topcoat as holiday and gift wrapping papers, pouch papers, and as backing for fiberglass insulations, fiberboards, flakeboards, hardboards, and insulation boards.

15. A process for metallizing papers and plastics comprising:
  A. preparing a metallic printing ink which consists essentially of:
    (1) a thermoplastic resin binder selected from the group consisting of substituted styrene copolymer resins, chlorinated rubber, and styrene resins,
    (2) a leafing grade aluminum paste, and
    (3) a solvent selected from the group consisting of toluene, methyl ethyl ketone, methyl isobutyl ketone, and mixtures thereof;
  B. applying said printing ink to a base selected from the group consisting of paper, paperboard, and plastic film by means of a printing process selected from the group consisting of relief and intaglio printing processes and drying said applied printing ink to form a metallized coating on said base; and
  C. heat treating said coating at about 300° F. to cause said aluminum particles to come to the surface to form a highly reflecting coating.

16. The process of claim 15 wherein said aluminum paste comprises by weight:
  A. 62-72.5 weight percent of finely divided aluminum flakes;
  B. 1.0-3.0 weight percent of stearic acid; and
  C. 24.5-37 weight percent of exempt mineral spirits.

17. The process of claim 16 wherein said printing ink comprises by weight approximately:
  A. 42 percent of said resin binder;
  B. 16 percent of said leafing grade aluminum paste; and
  C. 42 weight percent of said solvent.

* * * * *